US006202081B1

(12) United States Patent
Naudus (10) Patent No.: US 6,202,081 B1
(45) Date of Patent: Mar. 13, 2001

(54) METHOD AND PROTOCOL FOR SYNCHRONIZED TRANSFER-WINDOW BASED FIREWALL TRAVERSAL

(75) Inventor: Stanley T. Naudus, Springfield, VA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/119,987

(22) Filed: Jul. 21, 1998

(51) Int. Cl.$^7$ ....................................... G06F 15/16
(52) U.S. Cl. .................... 709/200; 709/218; 709/227; 709/228; 709/230; 709/249; 713/201; 370/401
(58) Field of Search .................... 709/200–203, 709/217–218, 227–230, 232–233, 248–250; 713/201–202, 151, 153, 155–156, 163, 174; 370/231–232, 252–253, 401

(56) References Cited

U.S. PATENT DOCUMENTS

| | | | |
|---|---|---|---|
| 5,416,842 | 5/1995 | Aziz ........................................ | 380/30 |
| 5,778,174 | 7/1998 | Cain ...................................... | 713/201 |
| 5,805,803 | * 9/1998 | Birrell et al. ......................... | 709/228 |
| 5,825,891 | * 10/1998 | Levesque et al. .................... | 713/153 |
| 5,826,014 | 10/1998 | Coley et al. .......................... | 713/201 |
| 5,828,833 | 10/1998 | Belville et al. ....................... | 713/201 |
| 5,864,666 | 1/1999 | Shrader ................................. | 713/201 |
| 5,915,087 | * 6/1999 | Hammond et al. ................... | 713/201 |
| 5,987,611 | * 11/1999 | Freund .................................. | 713/201 |
| 5,999,979 | * 12/1999 | Vellanki et al. ...................... | 709/232 |
| 6,018,516 | * 1/2000 | Packer .................................. | 370/231 |
| 6,070,243 | * 5/2000 | See et al. ............................. | 709/229 |
| 6,104,716 | * 8/2000 | Crichton et al. ..................... | 370/401 |
| 6,119,235 | * 9/2000 | Vaid et al. ............................ | 713/201 |

OTHER PUBLICATIONS

Ari Luotonen, Internet Engineering Task Force (IETF), Internet Draft, "Tunneling TCP based protocols through Web proxy servers", <draft–luotonen–web–proxy–tunneling–01.txt> , Aug. 1998, pp.1–9.

Daniel Senie, Internet Engineering Task Force (IETF), Internet–Draft, "Changing the Default for Directed Broadcasts in Routers", <draft–senie–directed–broadcast–02.txt> , Oct. 1998, pp.1–3.

Ross Finlayson, Internet Engineering Task Force (IETF), Internet–Draft, "IP Multicast and Firewalls", <draft–ietf–mboned–mcast–firewall–02.txt> , Nov. 1998, pp.1–8.

* cited by examiner

Primary Examiner—Ahmad F. Matar
Assistant Examiner—Bharat Barot
(74) Attorney, Agent, or Firm—McDonnell Boehnen Hulbert & Berghoff; Stephen Lesavich

(57) ABSTRACT

A protocol and method for synchronized transfer-window based firewall traversal is provided. The firewall traversal protocol includes messages for securely opening and closing a virtual data transfer-window through a firewall. The method allows a first network device inside a firewall to allow a virtual data transfer-window through a firewall to be opened with a second network device outside the firewall by sending the second network device secure information with the firewall traversal protocol. The secure information allows the second network device outside the firewall to securely traverse the firewall through the virtual data transfer-window to reach the first network device inside the firewall. The protocol and method help to improve firewall security and may help make the firewall less vulnerable to a number of common firewall attacks.

20 Claims, 7 Drawing Sheets

FIG. 1

FIG. 3
IP AUTHENTICATION HEADER

FIG. 4

FIG. 5
FIREWALL TRAVERSAL PROTOCOL MESSAGE LAYOUT

METHOD AND PROTOCOL FOR SYNCHRONIZED TRANSFER-WINDOW BASED FIREWALL TRAVERSAL

FIELD OF INVENTION

The present invention relates to computer networks. More specifically, it relates to a method and protocol for synchronized transfer-window based firewall traversal in a computer network.

BACKGROUND OF THE INVENTION

Firewalls are a security feature used to protect a computer network from potentially hostile attacks from outside the computer network. For example, a firewall may protect a Local Area Network ("LAN") from malicious attacks from the Internet or another computer network. Firewalls typically provide security services by filtering out data traffic that may be inappropriate, suspicious or dangerous. To implement filtering, a firewall is designed to interpret the type of data traffic that is being sent through it. The more information that a firewall has about transactions taking place through it, the more security it can provide.

In firewalls known in the art, there are three broad classes of security mechanisms including: packet mode filtering; circuit mode filtering; and application gateway filtering. Packet mode filtering is the simplest of all firewall mechanisms. Packet mode filtering includes using the content of data packets passing through the firewall to determine if a packet should be allowed to pass through the firewall. For example, network addresses such as Internet Protocol ("IP") addresses and source and destination port numbers, such as Transmission Control Protocol ("TCP") or User Datagram Protocol ("UDP") port numbers are used to filter data traffic. As is known in the art, IP is an addressing protocol designed to route traffic within a network or between networks. TCP provides a connection-oriented, end-to-end reliable protocol designed to fit into a layered hierarchy of protocols that support multi-network applications. UDP provides a connectionless mode of communications with datagrams in an interconnected set of networks Circuit mode filtering includes predicting a data flow of data packets across the firewall and filtering all packets that do not conform to an expected data flow. For example, if a data flow with a predetermined class-of-service or quality-of-service is being used, data packets that do not conform to the predetenmined class-of-service or quality-of-service will be filtered.

Application gateway filtering includes using protocol layers to determine what transactions are occurring between network elements. The application gateway will either drop or terminate data sessions that are viewed as "non-conforming" to expected data transactions. For example, application gateway filtering uses a Network, Transport, or Application layer to determine what is transpiring between network elements. As is known in the art, an Open System Interconnection ("OSI") model is used to describe protocol layers in computer networks. The OSI model consists of seven layers including from lowest-to-highest, a Physical, Data link, Network, Transport, Session, Application and Presentation layer.

Application gateway filtering can also monitor multiple protocols in multiple protocol layers. For example, the H.323 networking protocol typically uses H.225 with Q.931, H.225 with Registration and Admission Status ("RAS"), H.245 and Real-Time Protocol ("RTP") during an H.323 session. As is known in the art, H.323, is the main family of video conferencing recommendations for Internet Protocol networks. RTMP is a transport layer protocol for packet based multimedia communication systems. H.323 uses RTP for its transport layer. As is known in the art, Q.931 and RAS are multimedia signaling protocols. H.245 is a control protocol for establishing multimedia communications. Real-Time Protocol ("RTP") provides a timing synchronization and sequence number mechanism when B.323 is used.

It is also possible for a firewall to combine packet mode filtering, circuit mode filtering and application gateway filtering with multiple protocols. Such a firewall uses combined filtering mechanisms to provide stronger firewall security than could be obtained by a firewall using a single filtering technique.

Firewalls help prevent a number of attacks on a computer network including: denial of service attacks; replay attacks; rewrite attacks; compromise-of-a-master key; and others. During a denial-of-service attack, a malicious user performs unwanted actions (e.g., sending thousands of data packets to request a service) to overload a network device and cause it to loose its ability to communicate with other network devices. A firewall can help prevent denial-of-service attacks by setting a limit on a number of data packets that can be received for a given action.

Replay attacks occur when a malicious user gains access to a router or other network device on a computer network that is forwarding data packets. Legitimate data packets are intercepted and then re-sent at a later time to allow the malicious user to appear as a legitimate user. A firewall helps prevent replay attacks by checking a time-stamp in the data packet that prevents the data packets from being re-sent at a later time.

Re-write attacks arc characterized by a malicious user intercepting a transmitted data packet, changing its content in some way, and then forwarding the data packet to its original destination. A firewall helps prevent re-write attacks by verifying the contents of a data packet (e.g., with a secure hashing function such as Message Digest-5 ("MD5") or encryption.

Compromise-of-a-master key attacks occur when encryption or MD5 authentication is used. It is possible for a malicious user, after a long period of time (e.g., a few days), to capture enough data packets to eventually determine what master key is being used for encryption or MD5. A firewall helps prevent compromise-of-master-key attacks by requiring a master key used for encryption or MD5 authentication be changed on a regular basis.

It is often necessary for a first network device on a first computer network inside a firewall to receive a large amount of information on a regular basis through a firewall from a second network device on second computer network outside a firewall over a third network. For example, a host computer on a Local Area Network ("LAN") receives e-mail and/or data files on a daily basis from an Internet Service Provider ("ISP") over the Internet through a firewall. The connection and transfer process, even through a firewall, is subject to attack by malicious users.

There are several problems with using firewalls to protect a computer network from a malicious attack during day-to-day transfer of information from another computer network via the Internet. In general, firewalls provide little protection against data packets that lack both authentication information in each packet or a state, time or pre-assigned sequence number that is assigned within each packet.

For example, during a data transfer process, a common denial-of-service attack that is used via the Internet is a "TCP SYN" attack. To initiate a legitimate TCP connection, a network device transmits a TCP segment with a SYnchronize sequence Numbers ("SYN") flag set in a TCP SYN segment. Since the TCP SYN segment is a legitimate TCP packet for initiating a TCP connection, a firewall cannot filter out TCP SYN segments and does not provide any protocol state to verify against too many of such segments from being sent by a malicious user to overload a system.

If data packets sent during a day-to-day transfer of information are not time-stamped, a reply attack could occur since a firewall has no way of determining when the data packets were actually sent. If authentication is not used, then re-write attacks could occur. If encryption is not used, then privacy may be lost as information being sent can be viewed by others. Thus, it is desirable to use a firewall that provides a higher-level of security to protect a computer network during day-to-day tasks.

SUMMARY OF THE INVENTION

In accordance with a preferred embodiment of the present invention, some of the problems associated with using firewalls are overcome. A protocol and method for synchronized transfer-window based firewall traversal is presented. The firewall traversal protocol and method are used by a first network device on a first network inside a firewall to coordinate a connection with a second network device on a second network outside the firewall. Secure firewall traversal information is sent from inside the firewall to outside the firewall. In firewall traversals known in the art, a second network device on a second network outside a firewall typically coordinates a connection with the first network device on the first network inside a firewall. A preferred embodiment of the present invention coordinates a connection through a firewall from inside the firewall.

The firewall traversal protocol includes an open-transfer window message, an open-transfer window acknowledgment message, a close-transfer-window message and a close-transfer window acknowledgment message. However, the firewall traversal protocol can also include more or fewer messages and preferred embodiment of the present invention is not limited to four firewall traversal protocol messages. The open transfer-window message opens a "virtual" data transfer-window in a firewall. The open transfer-window message includes secure firewall traversal information such as: a network address of a network device within a firewall (e.g., an IP address of a specific network access card) to use for data transfer; a starting firewall traversal sequence number to use to begin a data transfer; Security Parameters Index ("SPI") or other encryption indicator; transfer rate information to ensure the network device is not overloaded during the data transfer; or other desired information. The open transfer-window acknowledgment message includes firewall traversal information from the open transfer-window message and acknowledges the open transfer-window message, thereby providing synchronized firewall traversal.

The close transfer-window message closes a virtual data transfer-window and the close transfer-window acknowledgment message acknowledges the close transfer-window message. The close-transfer window message and close-transfer-window acknowledgment messages also include firewall traversal information from the open transfer-window message for authentication. The firewall traversal protocol helps create a secure virtual data transfer-window through the firewall and improves firewall security by overcoming some of the firewall attacks described above.

The firewall traversal method includes sending a first secure message with a firewall traversal protocol from a first network device on a first network inside a firewall to a second network device on a second network outside the firewall. The first secure message includes firewall traversal information that helps the second network device to traverse the firewall protecting the first network via a "virtual" data transfer-window through the firewall.

A second secure message is received with the firewall traversal protocol on the first network device from the second network device creating a virtual data transfer-window through the firewall. The second secure message includes firewall traversal information from the first secure message and is used to authenticate the second network device. Multiple secure data packets are received on the first network device in the virtual data transfer-window through the firewall from the second network device. The multiple secure data packets received in the virtual data transfer-window include information from the first secure message to help authenticate the multiple secure data packets at the firewall.

In a preferred embodiment of the present invention, the first secure message is an open transfer-window message from the firewall traversal protocol. The second secure message is an open transfer-window acknowledgment message from the firewall traversal protocol. However, other secure messages could also be used for firewall traversal.

The firewall traversal protocol and method of a preferred embodiment of the present invention allows a first network device inside a firewall to allow a virtual data transfer-window through a firewall to be opened with a second network device outside the firewall by sending the second network device secure information with a firewall traversal protocol. The secure information allows the second network device to securely traverse the firewall through the virtual data transfer-window. The protocol and method of a preferred embodiment of the present invention help to improve firewall security and may help make the firewall less vulnerable to a number of common firewall attacks.

The foregoing and other features and advantages of a preferred embodiment of the present invention will be more readily apparent from the following detailed description, which proceeds with references to the accompanying drawings.

DETAILED DESCRIPTION OF A PREFERRED EMBODIMENT

Network System

Figure 1:
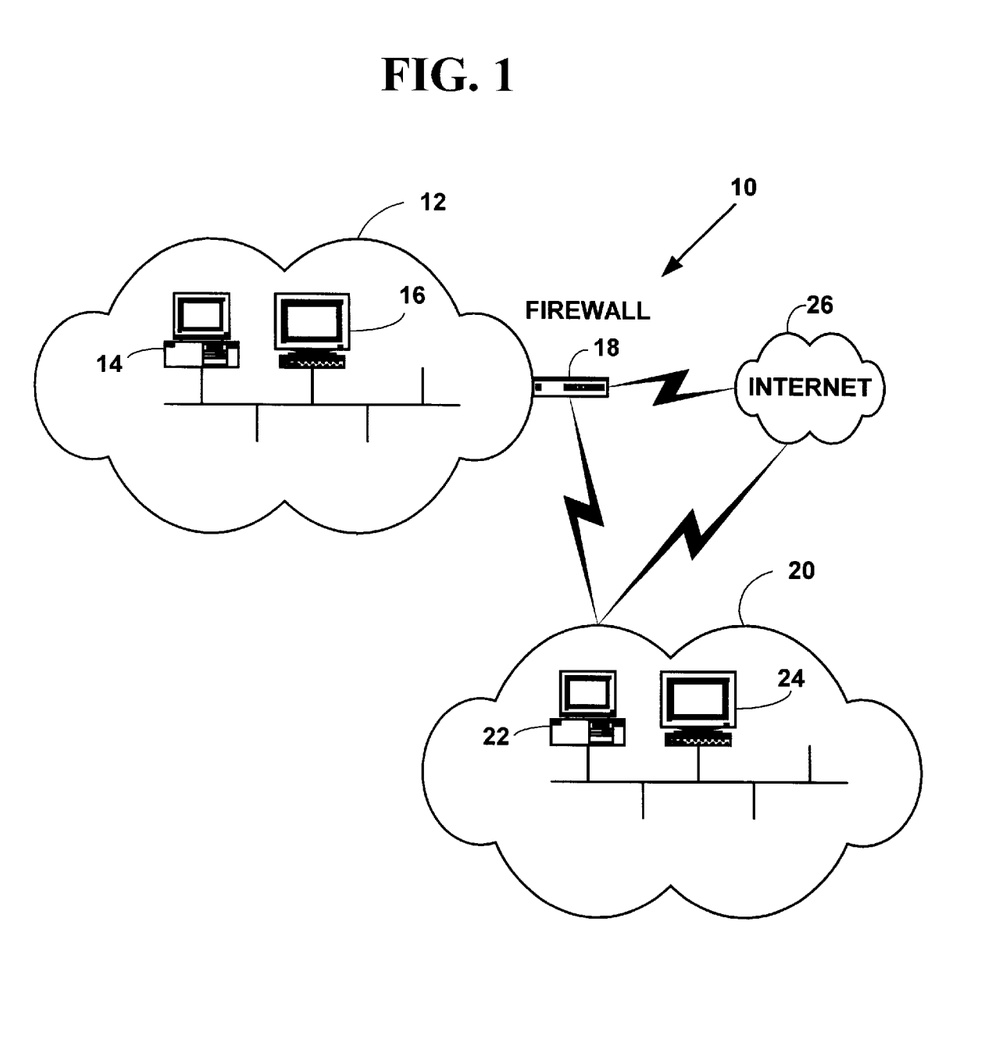
FIG. 1 is a block diagram illustrating a network system for firewall traversal.

FIG. 1 is a block diagram of a network system 10 for a preferred embodiment of the present invention. Network system 10 includes a first network 12 with multiple network devices (14, 16), two of which are illustrated, and a firewall 18. First network 12 is coimected to a second network 20, with multiple network devices (22, 24), two of which are illustrated, through firewall 18. First network 12 can be directly connected to second network 20 through firewall 18. First network 12 can also be connected to a second network 20 through firewall 18 via third network 26 (e.g., the Internet).

However, other network devices, network types and network components can also be used and the present invention is not limited to the network devices, network types and network components described. In addition, although illustrated with four network devices, and one firewall, network system 10 typically includes tens to thousands of network devices in networks (12, 20) and may also include multiple firewalls.

An operating environment for network devices and firewalls of a preferred embodiment the present invention include a processing system with at least one high speed Central Processing Unit ("CPU") and a memory system. In accordance with the practices of persons skilled in the art of computer programming, the present invention is described below with reference to acts and symbolic representations of operations that are performed by the processing system, unless indicated otherwise. Such acts and operations are referred to as being "computer-executed" or "CPU executed." Although described with one CPU, alternatively multiple CPUs may be used for a preferred embodiment of the present invention.

The memory system may include main memory and secondary storage. The main memory is high-speed random access memory ("RAM"). Main memory can include any additional or alternative high-speed memory device or memory circuitry. Secondary storage takes the form of long term storage, such as Read Only Memory ("ROM"), optical or magnetic disks, organic memory or any other volatile or non-volatile mass storage system. Those skilled in the art will recognize that the memory system can comprise a variety and/or combination of alternative components.

It will be appreciated that the acts and symbolically represented operations include the manipulation of electrical signals by the CPU. The electrical signals cause transformation of data bits. The maintenance of data bits at memory locations in a memory system thereby reconfigures or otherwise alters the CPU's operation. The memory locations where data bits are maintained are physical locations that have particular electrical, magnetic, optical, or organic properties corresponding to the data bits.

The data bits may also be maintained on a computer readable medium including magnetic disks, optical disks, organic disks and any other volatile or non-volatile mass storage system readable by the CPU. The computer readable medium includes cooperating or interconnected computer readable medium, which exist exclusively on the processing system or may be distributed among multiple interconnected processing systems that may be local or remote to the processing system.

In a preferred embodiment of the present invention, a first network device (e.g., first network device 14) on first network 12 inside firewall 18 first coordinates a connection with a second network device (e.g., second network device 22) on a second network 20 outside firewall 18 directly, or via third network 26 (e.g., the Internet) for data transfer (e.g., file transfer or e-mail retrieval) by sending secure firewall traversal information from inside firewall 18 to outside firewall 18 using a protocol and methods for firewall traversal described herein. In firewall traversals known in the art, a second network device on second network 20 outside firewall 18 typically first coordinates a connection with a first network device on first network 12 inside firewall 18.

Firewall Traversal Protocol

Figure 2:
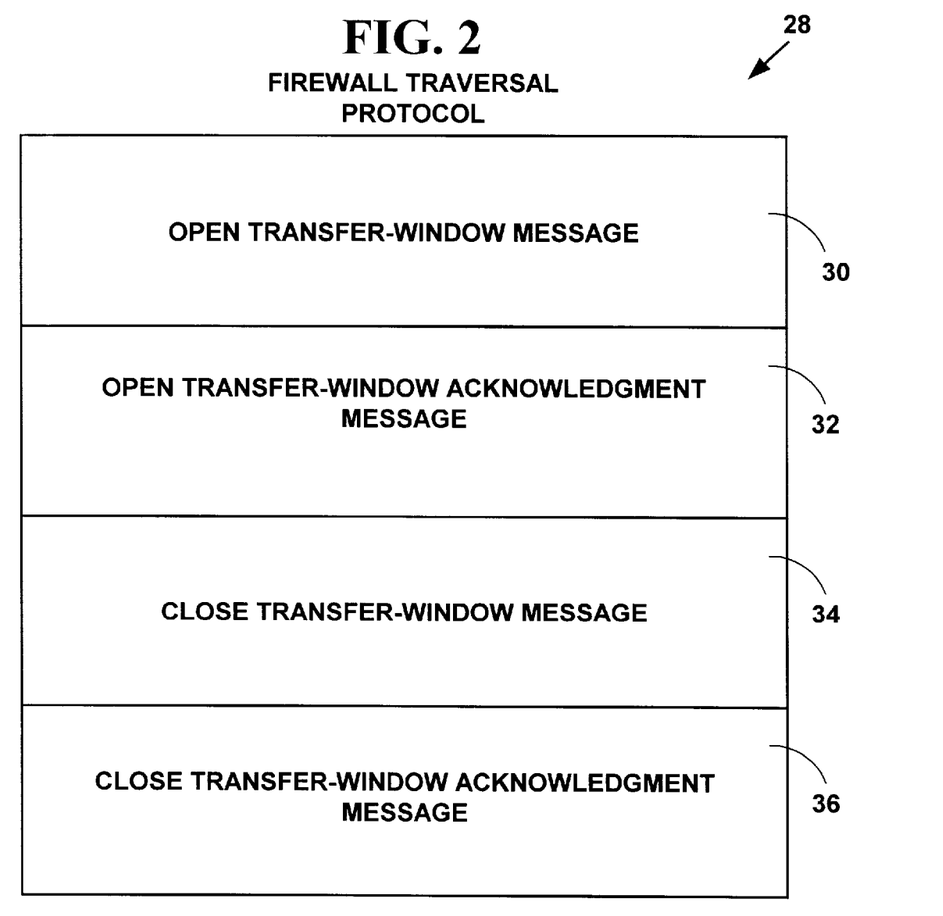
FIG. 2 is a block diagram illustrating a firewall traversal protocol.

FIG. 2 is a block diagram illustrating a firewall traversal protocol 28. Firewall traversal protocol 28 includes an Open-Transfer Window ("OTW") message 30, an Open-Transfer Window ACKnowledgment ("OTW ACK") message 32, a Close-Transfer Window ("CTW") message 34 and a Close-Transfer Window ACKnowledgment ("CTW ACK") message 36. However, firewall traversal protocol 28 can also include more or fewer messages and the present invention is not limited to the firewall traversal messages described herein.

Open transfer-window message 30 allows a "virtual" data transfer-window to be opened in firewall 18. Open transfer-window message 30 includes firewall traversal information such as: a network address for a network device within a firewall (e.g., an IP address of a specific network access card in the firewall) to use for data transfer; a starting firewall traversal sequence number to use to begin a data transfer, a Security Parameters Index ("SPI") or other encryption indicator; transfer rate information to ensure the network device is not overloaded during the data transfer; or other desired firewall traversal information. Open transfer-window acknowledgment message 32 includes firewall traversal information (e.g., a firewall traversal sequence number) from open transfer-window message 30 for authentication, and acknowledges the open transfer-window message 30 thereby providing synchronized firewall traversal.

Close transfer-window message 34 closes a virtual data transfer window through firewall 18 and close transfer-window acknowledgment messages 36 acknowledges close transfer-window message 34. Close-transfer window message 34 and close-transfer window acknowledgment message 36 also include firewall traversal information from open transfer-window message 30. The firewall traversal protocol helps create a secure virtual data transfer-window through firewall 18 and improves firewall security.

In a preferred embodiment of the present invention, firewall traversal protocol messages (30, 32, 34 and 36) from firewall traversal protocol 28 are sent outside firewall 18 using an Internet Protocol ("IP") Authentication Header ("AH") described in Internet Engineering Task Force ("IETF") Request-For-Comments ("RFC")-1826, incorporated herein by reference. A security architecture for the Internet Protocol is discussed in RFC-1825, incorporated herein by reference. Inside firewall 18, IP Authentication Header may or may not be used.

As is known in the art, IP is an addressing protocol designed to route traffic within a network or between networks. IP is described in RFC-791, incorporated herein by reference. However, other data packets and security mechanisms other than the IP Authentication Headers can also be used to send firewall traversal protocol messages outside firewall 18, and the present invention is not limited to a firewall traversal protocol using IP Authentication Headers. In addition, firewall traversal protocol 26 messages sent inside a firewall typically do not require use of an IP Authentication Header 38 and may be sent without authentication.

Figure 3:
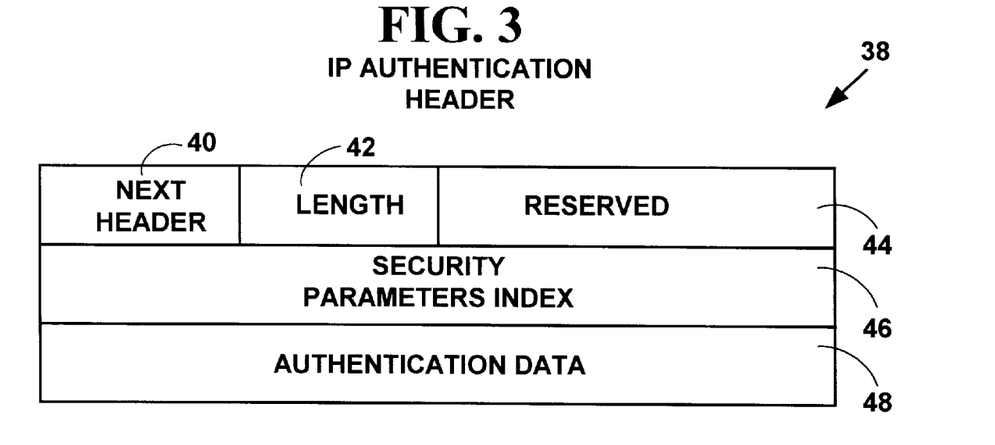
FIG. 3 is a block diagram illustrating an Internet Protocol Authentication Header.

FIG. 3 is a block diagram illustrating an exemplary IP Authentication Header 38. IP Authentication Header 38 includes: a next header-field 40, a length-field 42; a reserved-field 44; a Security Parameters Index-field ("SPI") 46; and an Authentication Data-field 48.

Next header-field 40 is 8-bits wide and identifies a next data payload after the authentication data. Length-field 42 is 8-bits wide and is the length of the authentication data in 32-bit words. Reserved-field 44 is 16-bits wide is reserved for future use and is currently set to all zeros. Security Parameters Index-field 46 is a 32-bit pseudo-random value identifying a security association for a data packet. As is known in the art, a security association identifies an encryption technique (e.g., Hashed Message Authentication Code ("HMAC"), keyed-Message Digest-5 ("MD5")) and key used to either create or sign a hash. For more information on HMAC-MD5 IP authentication with reply protection see RFC-2085 incorporated herein by reference. Data-field 48 is a variable length field including authentication data such as the firewall traversal messages (30, 32, 34, 36) described above for firewall traversal protocol 28.

Figure 4:
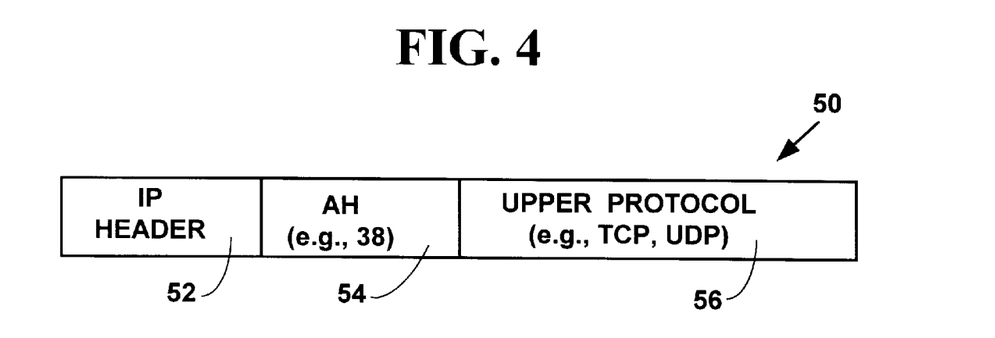
FIG. 4 is a block diagram illustrating an Internet Protocol data packet layout with an Internet Protocol Authentication Header.

FIG. 4 is a block diagram illustrating an exemplary IP data packet layout 50 with IP Authentication Header 38. IP data packet 50 includes an IP header-field 52, an Authentication Header-field 54 (e.g., Authentication Header 38, FIG. 3) and an Upper Protocol-field 56 for protocols such as Transmission Control Protocol ("TCP") or User Datagram Protocol ("UDP"). However, other IP data packet layouts may also be used. For example, there may be additional headers before Authentication Header 54 (e.g., a hop-by-hop routing header for IP version 6), and additional headers after Authentication Header 56. Firewall traversal protocol 28 is used in Authentication Header-field 54.

Upper Protocol Field 56 includes a transport protocol such as TCP or UDP. As is known in the art, TCP provides a connection-oriented, end-to-end reliable protocol designed to fit into a layered hierarchy of protocols that support multi-network applications. TCP provides for reliable interprocess communication between pairs of processes in network devices attached to distinct but interconnected networks. For more information on TCP see RFC-793, incorporated herein by reference.

UDP provides a connectionless mode of communications with datagrams in an interconnected set of computer networks. UDP provides a transaction-oriented datagram protocol, where delivery and duplicate packet protection are not guaranteed. For more information on UDP see RFC-768, incorporated herein by reference.

In another embodiment of the present invention, an authentication header is used for UDP datagrams. In such an embodiment, IP Authentication Header 54 is not used and removed from IP data packet layout 50. A UDP authentication header is used instead. The UDP authentication header may be included in Upper Protocol Field 56. In such an embodiment, UDP datagrams are sent to a designated UDP port. Authentication checking is completed only on UDP datagrams arriving on the designated UDP port.

Using firewall traversal protocol 28 in IP Authentication Header 38 provides an additional level of security for firewall traversal. IP Authentication Header 38 allows a network device inside a firewall to securely contact a network device outside the firewall and set up a virtual data transfer-window. The virtual data transfer-window allows the external second network device to traverse the firewall in a secure manner to communicate with a first network device inside the firewall.

As is known in the art, an IP Authentication Header holds authentication information for an IP data packet. A cryptographic authentication function with a predetermined key, such as HMAC or keyed-MD5 is computed over the IP data packet with a secret authentication key used for the computation. For more information on MD5, see RFC-1828, incorporated herein by reference. For more information on HMAC see RFC-2085, RFC-2104, RFC-2202 and RFC-2286, incorporated herein by reference. A network device sending the IP data packet computes the authentication data prior to sending the authenticated IP packet. A receiving network device verifies the correctness of the authentication data in the IP data packet.

The secure firewall traversal information sent in open transfer-window message 30 including firewall traversal sequence numbers help reduce common fire wall attacks such as denial-of-service attacks, sent by a rogue network device. Since firewall traversal sequence numbers are assigned from inside firewall 18 in a preferred embodiment of the present invention, data packets not using a proper firewall traversal sequence number assigned with open transfer-window message 30 are filtered at firewall 18, thereby improving firewall security (e.g., against denial-of-service attacks).

Figure 5:
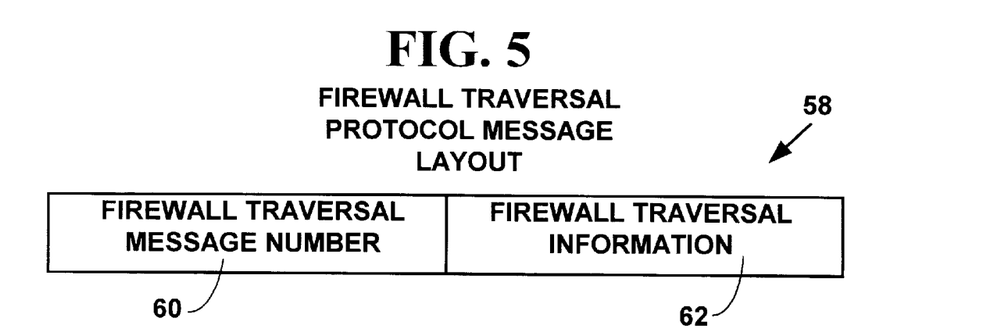
FIG. 5 is a block diagram illustrating a firewall traversal message layout for firewall traversal protocol messages.

FIG. 5 is a block diagram illustrating a firewall traversal message layout 58 for firewall traversal protocol 28 messages. Firewall traversal message layout 58 includes a message number field-60 including a message number for open transfer-window message 30, open transfer-window acknowledgment message, close transfer-window message 34 and close transfer-window message 36 (e.g., message numbers 1, 2, 3, and 4). Firewall traversal message layout 58 also includes a firewall traversal information-field 62 for storing firewall traversal information (e.g., firewall traversal sequence number, etc.). However, more or fewer fields could also be used in firewall traversal message layout 58. Firewall traversal message layout 58 is used in authentication data-field 48 of IP authentication header 38 of FIG. 3 when a firewall protocol message is sent outside firewall 18. Firewall traversal message layout 58 is used in an IP packet without an authentication header when a firewall protocol message is sent inside firewall 18.

Firewall Traversal Using a Firewall Traversal Protocol

Figure 6:
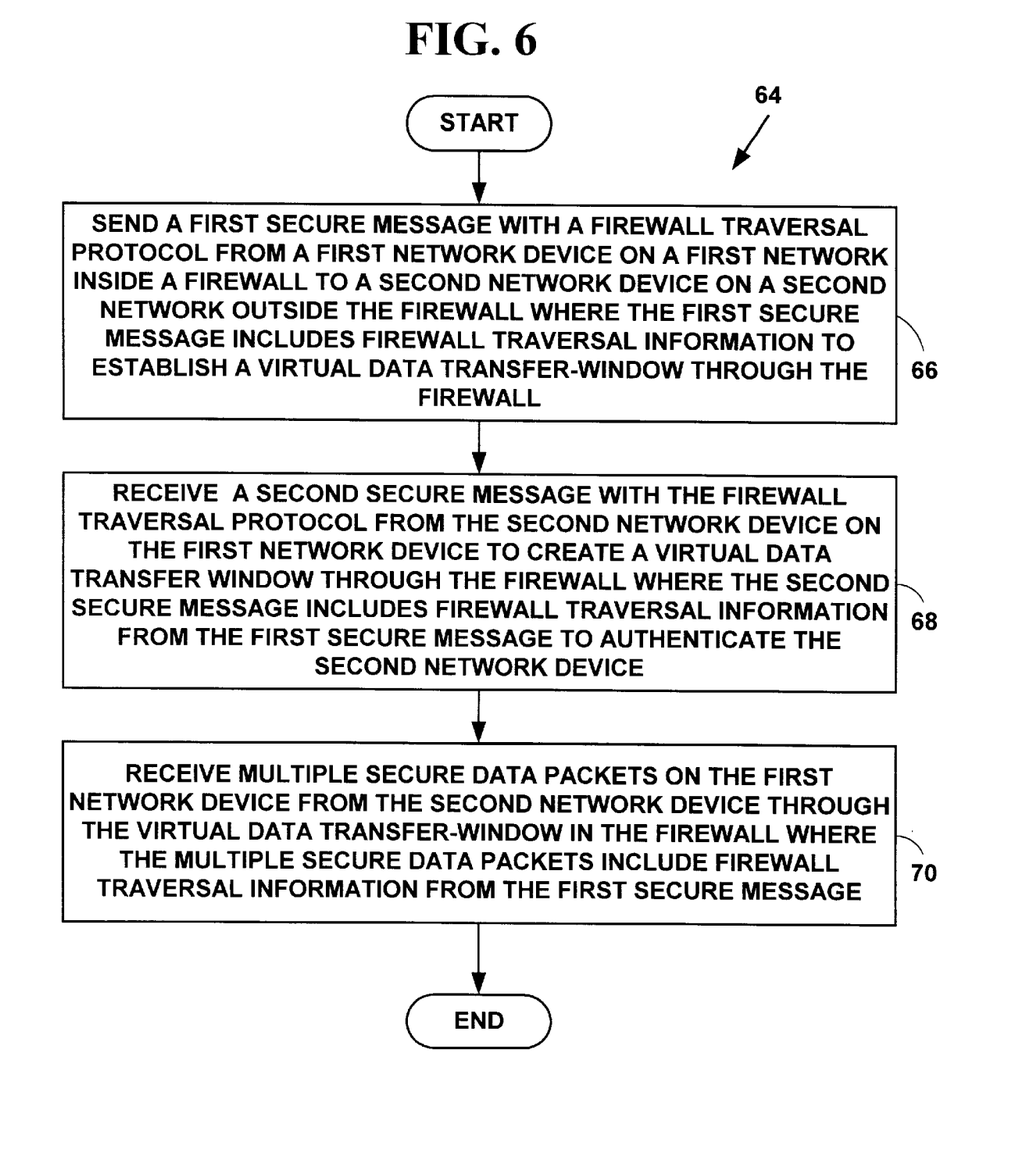
FIG. 6 is a block diagram illustrating a method for firewall traversal.

FIG. 6 is a block diagram illustrating a method 64 for firewall traversal. At step 66, a first secure message is sent with a firewall traversal protocol from a first network device on a first network inside a firewall to a second network device on a second network outside the firewall. The first secure message includes firewall traversal information that helps the second network device to traverse the firewall protecting the first network by allowing a "virtual data transfer-window" through the firewall to be created. In a preferred embodiment of the present invention, the first secure message is created by a network device inside a firewall. In another embodiment of the present invention, a firewall receives a first message with firewall traversal information from a first network device inside the firewall and creates a first secure message with the firewall traversal information that is sent outside the firewall.

At step 68, a second secure message is received with the firewall traversal protocol on the first network device from the second network device creating a virtual data transfer-window through the firewall. The second secure message includes firewall traversal information from the first secure message to authenticate the second network device.

The virtual data transfer-window created in a preferred embodiment of the present invention is a "virtual tunnel." As is known in the art, a virtual tunnel can be created by encapsulating a data packet inside another data packet. For example, an outer header is added before an inner header of a data packet. Between the inner header and outer headers are any other headers for a data path, such as security headers specific to the tunnel configuration. The outer header identifies the "endpoints" of the tunnel. The inner header identifies the original sender and recipient of the data. For more information on tunneling see RFC-1853, incorporated herein by reference.

For example, an outer header could be added to IP data packet 50 (FIG. 4) making IP header 52 an inner header. A security header such as Authentication Header 54 maybe included the outer header. However, another type of security header could be added between the inner header and the outer header. The outer IP header identifies endpoints of the virtual data transfer-window through firewall 18. The inner header identifies the original sender and recipient of the data (e.g., first network device 14 and second network device 22).

In one preferred embodiment of the present invention, a virtual tunnel is created using UDP datagrams. In such an embodiment, a UDP authentication header is included in the UDP datagram. UDP datagrams are sent to a designated UDP tunnel port. Authentication checking is completed only on UDP datagrams arriving on the designated UDP tunnel port.

Returning to FIG. 6 at step 70, multiple secure data packets are received on the first network device in the virtual data transfer-window in the firewall from the second network device. The multiple secure data packets received through the data transfer-window in the firewall include firewall traversal information from the first secure message to authenticate the multiple secure data packets at the firewall. For example, the first secure message may include a firewall traversal sequence number-X. The second secure message includes a firewall traversal sequence number-X+1 to help authenticate the second message. The multiple secure data packets include firewall traversal sequence numbers-X+1+N, where N is the Nth-number secure data packet for authentication. Data packets received with improper firewall traversal sequence numbers are filtered by firewall 18.

In a preferred embodiment of the present invention, the first secure message sent at step 66 is open transfer-window message 30 from firewall traversal protocol 28 (FIG. 2). The second secure message received at step 68 is open transfer-window acknowledgment message 32 from firewall traversal protocol 28. However, other secure messages could also be used.

Figure 7:
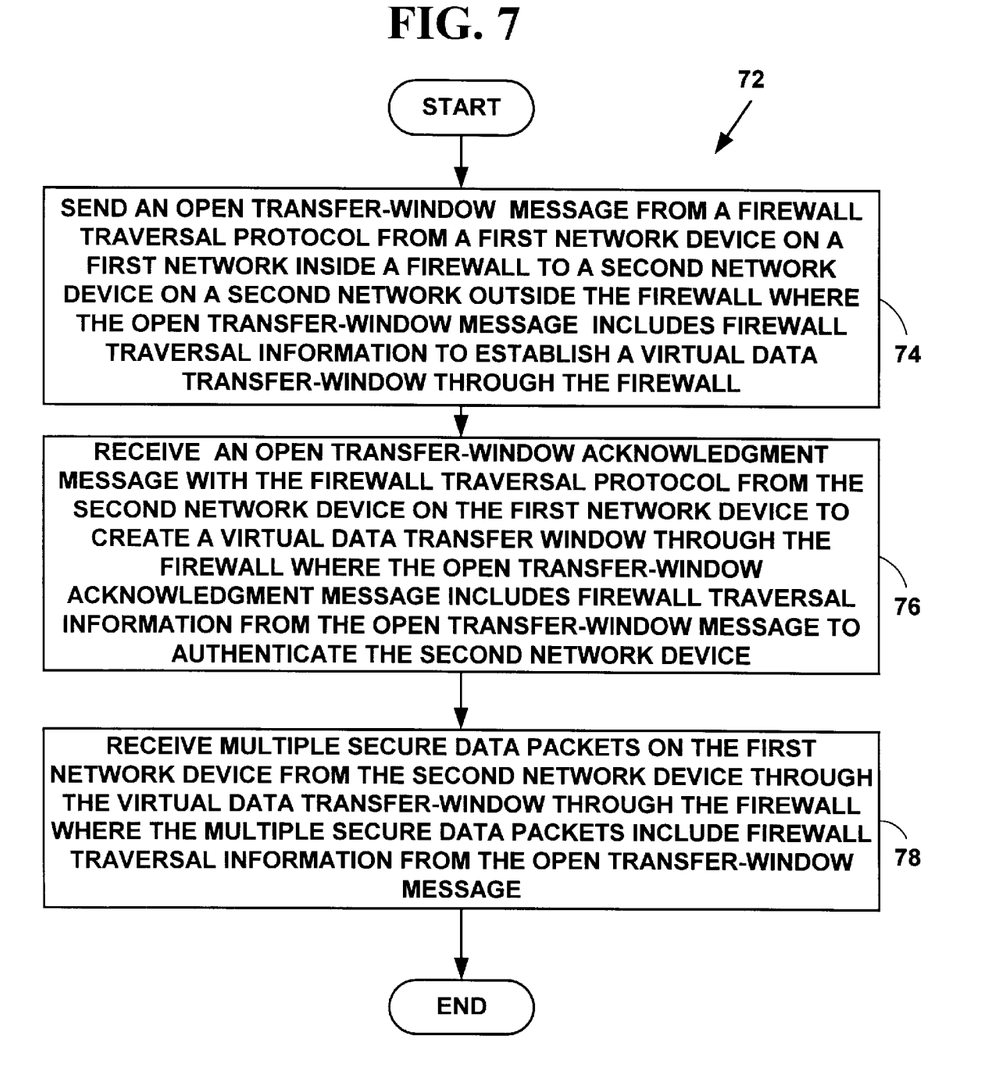
FIG. 7 is a block diagram illustrating a method for firewall traversal.

FIG. 7 is a block diagram illustrating a method 72 for firewall traversal for one preferred embodiment of the present invention. At step 74 of method 72, an open transfer-window message 30 from firewall traversal protocol 28 (FIG. 2) is sent from first network device 14 on first network 12 inside firewall 18 to second network device 22 on second network 20 outside firewall 18 via third network 26 (e.g., the Internet). Open transfer-window message 30 includes firewall traversal information in an IP Authentication Header 38 (FIG. 3) in an IP packet 50 (FIG. 4) using firewall traversal message layout 58 (FIG. 5) that helps second network device 22 to traverse firewall 18 protecting first network 12 by allowing a virtual data transfer-window through the firewall to be created.

At step 76, an open transfer-window acknowledgment message 32 from firewall traversal protocol 28 is received on first network device 14 from second network device 22 creating a virtual data transfer-window as a "virtual tunnel" through firewall 18. Open transfer window acknowledgment 32 message includes firewall traversal information from open transfer-window message 30 to authenticate second network device 22.

At step 78, multiple secure data packets are received on first network device 14 through the virtual data transfer-window in firewall 18 from second network device 22 via third network 26. The multiple secure data packets received through the data transfer-window in the firewall include firewall traversal information from open transfer-window message to authenticate the multiple secure data packets at firewall 18.

To close a virtual data transfer-window, a network device sends a close transfer-window message 34. Close transfer-window message 34 is acknowledged by close transfer-window acknowledgment message 36. For example, when second network device 22 from method 72 has completed sending the multiple secure data packets to first network device 14, second network device 22 sends a close transfer-window message 34 to first network device 14. First network device 14 responds with a close transfer-window acknowledgment message 36 to close the virtual data transfer-window through firewall 18. First network device 14 can also close the virtual data transfer-window through firewall 18 by sending a close transfer-window message 34. Second network device 22 responds with a close transfer-window acknowledgment message 36.

Firewall Traversal in a Network System

Figure 8:
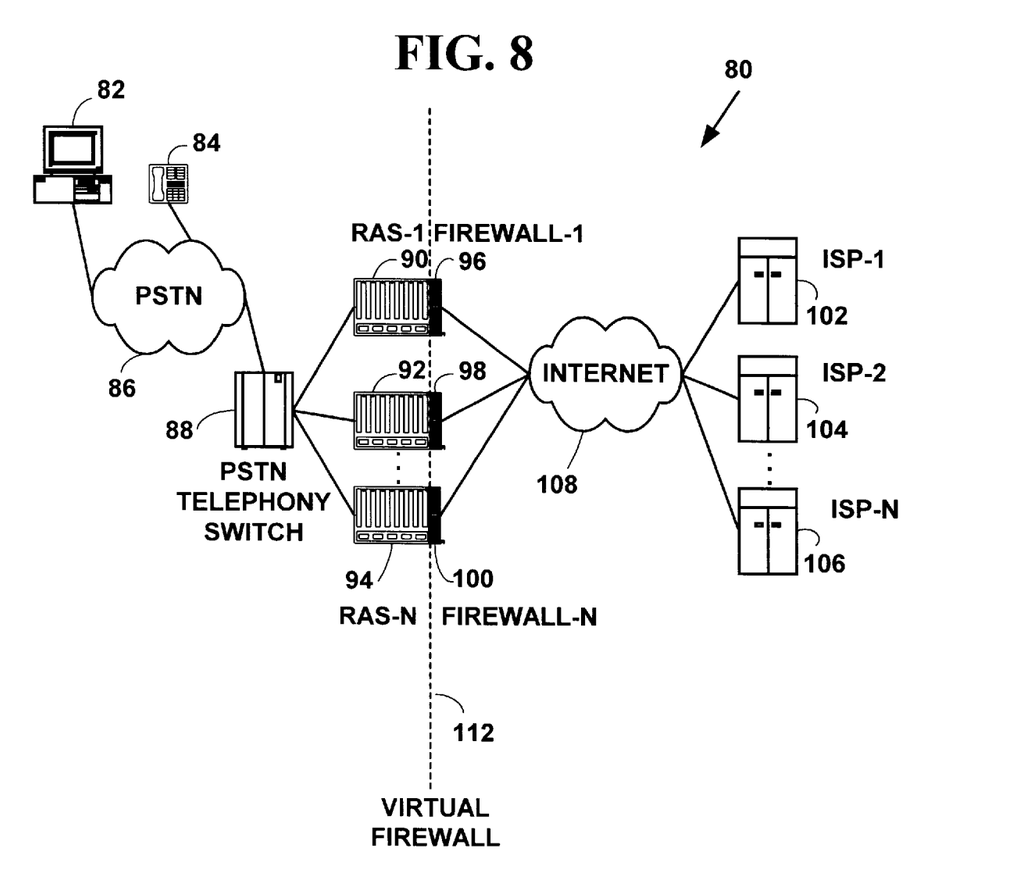
FIG. 8 is a block diagram illustrating a firewall traversal network system.

In one preferred embodiment of the present invention, firewall traversal protocol 28 and firewall traversal protocol 64 are used with the network system illustrated in FIG. 8. FIG. 8 is a block diagram illustrating a firewall traversal network system 80. Firewall traversal network system 80 includes multiple host network devices 82, 84, two of which are illustrated, connected to a Public Switched Telephone Network ("PSTN") 86 including multiple PSTN telephony switches 88, one of which is illustrated. PSTN 86 is any of those provided by AT&T, Regional Bell Operating Companies (e.g., Ameritech, U.S. Vest, Bell Atlantic, Southern Bell Communications, Bell South, NYNEX, and Pacific Telesis Group), GTE, and others. PSTN telephony switch 88 is any of those provided by Siemens AG, of Munich Germany, Lucent Technologies, of Murray Hill, N.J., Nortel, of Brampton, Ontario, Canada and others.

PSTN telephony switch 88 is connected to one or more Remote Access servers ("RAS") 90, 92, and 94, three of which are illustrated. In a preferred embodiment of the present invention, Remote Access Servers 90, 92, 94 are Total Control Telephony Hubs by 3Com Corporation of Santa Clara, Calif. A Total Control Telephony Hub is described in U.S. Pat. No. 5,528,595, granted to Dale M.Walsh et al., incorporated herein by reference. However, other Network Access Servers could also be used including those by Lucent Technologies (including those by the former Livingston Enterprises, Inc. of Pleasanton, Calif.), Ascend Communications of Alameda, Calif. and others. In a preferred embodiment of the present invention, Remote Access Servers 90, 92, 94 include integral firewalls 96, 98, 100. In another embodiment of the present invention, Remote Access Servers 90, 92, 94 are connected to external firewalls (not illustrated in FIG. 8). Remote Access Servers 90, 92, 94 conmect PSTN telephony switch 88 to multiple Internet Service Providers ("ISP") 102, 104, 106, three of which are illustrated, via the Internet 108. Individual firewalls 96, 98, 100, integral to RAS 90, 92, 94 form a "virtual" firewall 112 protecting RAS 90, 92, 94 and PSTN telephony switch 88 from Internet 108 indicated by the dashed line in FIG. 8.

Firewall traversal protocol 28 (FIG. 2) firewall traversal method 64 (FIG. 6) and firewall traversal telephony network system 80 are used for day-to-day data transfer. For example, network host 82 makes daily e-mail retrieval request. The request is routed through PSTN 86 to PSTN telephony switch 88. PSTN Telephony switch 88 sends an open transfer-window message 30 to a RAS (e.g., RAS 90). Since PSTN telephony switch 88 is inside a firewall 96 protecting RAS 90 from Internet 108, the open transfer window message 30 is sent to RAS 90 using firewall traversal protocol 38 message layout 50 (FIG. 5) without an authentication header. IP Authentication Header 38 (FIG. 2) may not be used to send the open transfer window message 30 inside firewall 96. However, if necessary, IP Authentication Header 38 can be used inside a firewall. Open transfer window message 30 includes firewall traversal information such as a firewall traversal sequence number-X, a transmission channel and data rate information from PSTN telephony switch 88. RAS 90 may add additional firewall traversal information to open transfer-window message 30 such as a network address of RAS 90 (e.g., an IP address) and may add open transfer-window message 30 to an IP authentication header 38 (FIG. 3) in an IP data packet 50 (FIG. 4).

The IP data packet 50 with authentication header 38 is sent to the appropriate ISP (e.g., 102) outside firewall 96 via Internet 108 to retrieve the e-mail. ISP 102 uses firewall traversal information (e.g., network address of RAS 90 and firewall traversal sequence number) from open transfer-window message 30) to send an open transfer-window acknowledgment message 32 back to RAS 90 via firewall 96. Since JSP 102 is outside firewall 96, open transfer-window acknowledgement message 32 is sent in an IP data packet 50 in Authentication Header 38. Open transfer-window acknowledgment message 32 creates a virtual data transfer-window through firewall 96. RAS 90 forwards open transfer-window acknowledgment message back to PSTN telephony switch 88 without IP authentication header 38 since RAS 90 and PSTN telephony switch 88 are both inside firewall 96. The virtual data transfer-window forms a virtual tunnel in firewall 96 (e.g., an IP tunnel, or a UDP tunnel).

ISP 102 sends e-mail update data packets through the virtual data transfer-window in firewall 96 to RAS 90 in IP Authentication Header 38 using firewall traversal information (e.g., firewall traversal sequence numbers). RAS 90 forwards the e-mail update data packets to PSTN telephony switch 88, without IP authentication header 38. PSTN telephony switch 88 forwards the e-mail update data packets back to host network device 82 via PSTN 86. In one embodiment of the present invention, an e-mail update data packet acknowledgment is sent by PSTN telephony switch 88 for each e-mail data packet sent by ISP 102. In another embodiment of the present invention, selected, but not all e-mail data packets are acknowledged.

Figure 9:
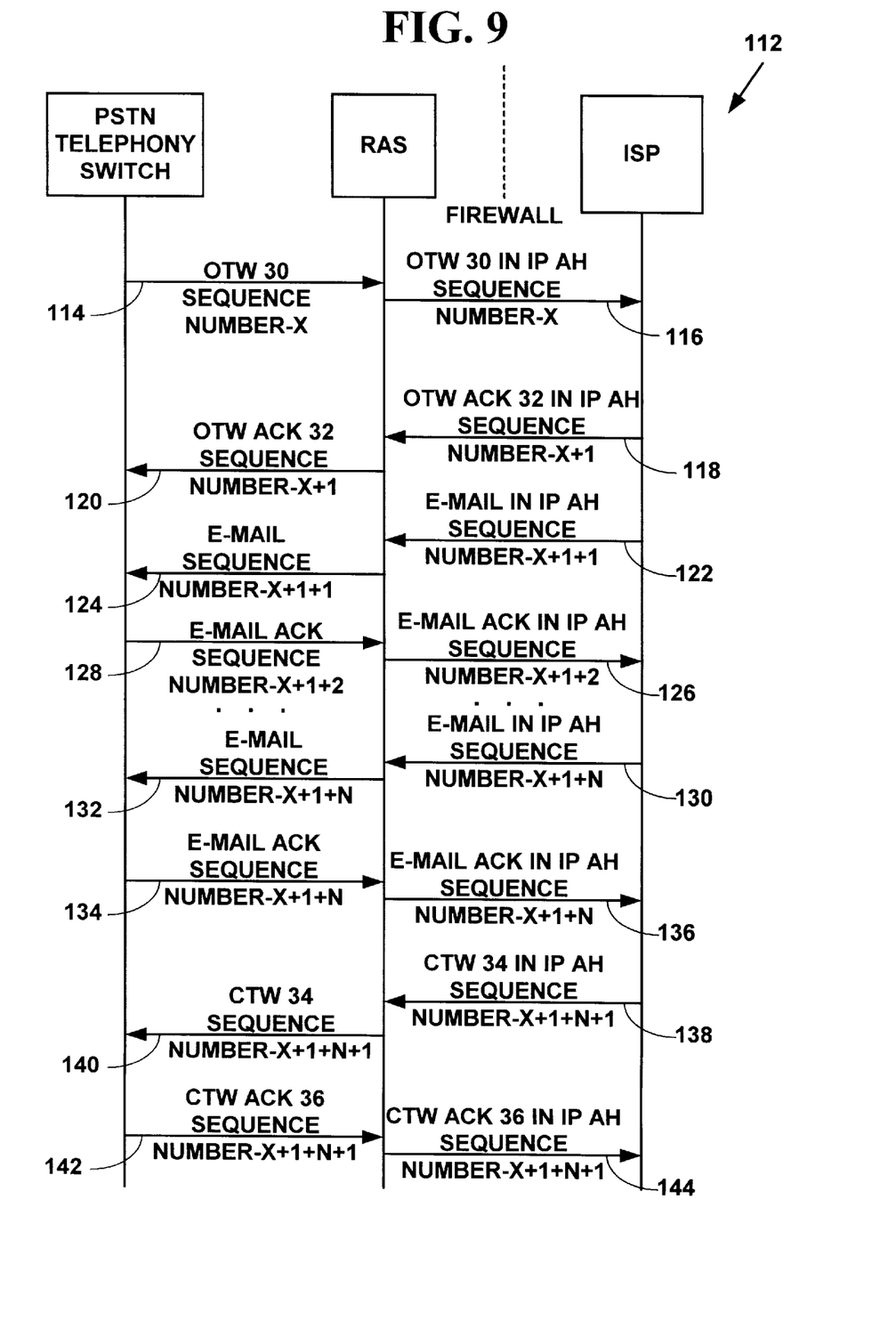
FIG. 9 is a block diagram illustrating a message flow for firewall traversal.

FIG. 9 is a block diagram illustrating a message flow 112 for firewall traversal in firewall traversal telephony system 80. PSTN telephony switch 88 sends 114 an open transfer window message 30 to a RAS (e.g., RAS 90) inside a firewall (e.g., firewall 96) with a firewall traversal sequence number-X and other firewall traversal information. In a preferred embodiment of the present invention, open transfer-window message 30 is sent from PSTN telephony switch 88 to RAS 90 in an IP data packet. However, open transfer-window message 30 can also be sent with other networking protocols. RAS 90 adds open transfer window message 30 including the firewall traversal information from PSTN telephony switch 88 as well as additional firewall traversal information (e.g., IP address of RAS 90) to an IP Authentication Header 38 in an IP data packet 50. RAS 90 sends 116 IP data packet 50 with Authentication Header 38 to an ISP (e.g., ISP 102) via firewall 96 to retrieve c-mail.

ISP 102 sends 118 an open transfer-window acknowledgment message 32 including information sent in open transfer window message 30 (e.g., firewall traversal sequence numberX+1) in an IP Authentication Header 338 to RAS 90 via firewall 96 to create a virtual data transfer-window through firewall 96. ISP 102 sends open transfer-window acknowledgment message 32 to RAS 90 using a network address (e.g., IP address) for RAS 90 included in firewall traversal information sent in open transfer-window message 30. RAS 90 forwards 120 open transfer window acknowledgment message 32 without an IP Authentication Header to PSTN telephony switch 88 to begin e-mail retrieval with ISP 102.

ISP 102 sends (122, 130) N-number of e-mail update data packets in an IP Authentication Header 338 to RAS 90 via firewall 96 including information sent in open transfer window message 30 (e.g., firewall traversal sequence numbers X+1+1 to X+1+N). RAS 90 forwards (124, 132) the N-number of e-mail update data packets to PSTN telephony switch 88 without an IP Authentication Header, which forwards them to network host 82 via PSTN 86. PSTN telephony switch 88 acknowledges the e-mail update packets (128,134) sent by ISP 102. RAS 90 forwards the e-mail acknowledgement packets (126,136) in an IP authentication header to ISP 102.

When ISP 102 has completed the e-mail transfer, ISP 102 sends 138 a close transfer-window 34 message in an IP Authentication Header 38 to RAS 90 via firewall 96 to end e-mail retrieval. RAS 90 forwards 140 close transfer window message 34 to PSTN telephony switch 88 to end e-mail retrieval. PSTN telephony switch 88 responds 142 with a close transfer-window acknowledgment message 36, acknowledging closing of the virtual data transfer-window with ISP 102. RAS 90 forwards 144 close transfer window acknowledgement message 36 to ISP 102 in an IP Authentication Header to close the virtual data transfer-window 138 between ISP 102 and PSTN telephony switch 88.

The firewall traversal protocol and methods described herein allow a first network device inside a firewall to open a virtual data transfer-window through the firewall with a second network device outside the firewall by sending the second network device secure information with a firewall traversal protocol. The secure information allows the second network device to securely traverse the firewall through a virtual data transfer-window. The firewall traversal protocol and methods of a preferred embodiment of the present invention help to improve firewall security and make the firewall less vulnerable to a number of common firewall attacks.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements and different component types may be used in the block diagrams.

The claims should not be read as limited to the described order or elements unless stated to that effect. Therefore, all embodiments that come within the scope and spirit of the following claims and equivalents thereto are claimed as the invention.

I claim:

1. In a first network with a plurality of network devices and a plurality of firewalls, the first network connected to a second network with a plurality of network devices, a method of firewall traversal, the method comprising the following steps:

sending a first secure message with a firewall traversal protocol from a first network device on a first network inside a first firewall to a second network device on a second network outside the first firewall, wherein the first secure message includes firewall traversal information that helps the second network device to traverse the first firewall protecting the first network by allowing a virtual data transfer-window to be created through the first firewall;

receiving a second secure message with the firewall traversal protocol on the first network device from the second network device network creating a virtual data transfer-window through the first firewall, wherein the second secure message includes firewall traversal information from the first secure message to authenticate the second network device; and receiving a plurality of secure data packets on the first network device in the virtual data transfer-window through the first firewall from the second network device, wherein the plurality of secure data packets received through the virtual data transfer-window in the firewall include firewall traversal information from the first secure message to authenticate the plurality of secure data packets at the first firewall.

2. The method of claim 1 further comprising:

receiving a third secure message through with the firewall traversal protocol on the first network device from the second network device to close the virtual data transfer-window through the first firewall; and sending a fourth secure message with the firewall traversal protocol from the first network device to the second network device to acknowledge closing of the virtual data transfer-window through the first firewall.

3. A computer readable medium having stored therein instructions for causing a central processing unit to execute the method of claim 1.

4. The method of claim 1 wherein the first secure message is an open-transfer-window message and the second secure message is an open-transfer-window acknowledgment message to from a firewall traversal protocol.

5. The method of claim 1 wherein the step of sending a first secure message includes sending any of a network address, starting firewall traversal sequence number, security parameter index, or transfer rate information in the first secure message as firewall traversal information.

6. The method of claim 1 wherein the first secure message firewall traversal information includes a starting firewall traversal sequence number-X, the second secure message includes a firewall traversal sequence number-X+1, and the plurality of secure data packets include a firewall traversal sequence number-X+1+N, where N is the Nth-number secure data packet.

7. The method of claim 1 wherein the first secure message includes secure information in an authentication header.

8. The method of claim 1 wherein the first secure message, second secure message and plurality of secure data packets are Internet Protocol data packets with firewall traversal information included in an Internet Protocol Authentication Header.

9. The method of claim 1 wherein the first network is a local area network, the second network is a local area network and the first network and second network are connected through a firewall by a third network.

10. The method of claim 9, wherein the third network is the Internet.

11. The method of claim 1 wherein the virtual data transfer-window is a virtual tunnel.

12. In a first computer network with a plurality of network devices and a plurality of firewalls, the first network connected to a second network with a plurality of network devices, a method of firewall traversal, the method comprising the following steps:

receiving a first secure message with a firewall traversal protocol on a second network device on a second network outside a first firewall from a first network device on a first network inside the first firewall, wherein the first secure message includes firewall traversal information that helps the second network device to traverse the first firewall protecting the first network by allowing a virtual data transfer-window to be created through the first firewall;

sending a second secure message with the firewall traversal protocol from the second network device to the first network device network to create a virtual data transfer-window through the first firewall, wherein the second secure message includes firewall traversal information from the first secure message to authenticate the second network device;

sending a plurality of secure data packets from the second network device to the first network device in the virtual data transfer-window through the first firewall, wherein the plurality of secure data packets received through the virtual data transfer-window in the firewall include firewall traversal information from the first secure message to authenticate the plurality of secure data packets at the first firewall.

13. A computer readable medium having stored therein instructions for causing a central processing unit to execute the method of claim 12.

14. A computer readable medium having stored therein a set of routines for implementing a firewall traversal protocol, the firewall traversal protocol allowing a first network device on a first network inside a firewall to communicate with a second network device on a second network outside the firewall, the set of routines implementing the firewall traversal protocol as data bits, the computer readable medium comprising:

an open transfer-window message, for opening a data transfer-window through a firewall, wherein the open transfer-window message is sent from a first network device on a first network inside a firewall to a second network device on a second network outside the firewall and includes firewall traversal information;

an open transfer-window acknowledgment message, for acknowledging a open transfer window message;

a close transfer-window message, for closing a data transfer-window through a firewall; and a close transfer-window message, for acknowledging a close transfer-window message.

15. The computer readable medium of claim 14 wherein the open transfer-window message firewall traversal information includes secure information to help authenticate a network device outside the firewall.

16. The computer readable medium of claim 14 wherein the firewall traversal information includes any of a firewall network address, starting firewall traversal sequence number, security parameter index, or transfer rate information.

17. The computer readable medium of claim 14 wherein the virtual data transfer-window is a virtual tunnel.

18. In a first network with a plurality of network devices and a plurality of firewalls, the first network connected to a second network with a plurality of network devices, a method of firewall traversal, the method comprising the following steps:

sending a open transfer window message with a firewall traversal protocol from a first network device on a first network inside a first firewall to a second network device on a second network outside the first firewall, wherein the first secure message includes firewall traversal information that helps the second network device to traverse the first firewall protecting the first network by allowing a virtual data transfer-window to be created through the first firewall;

receiving an open transfer window acknowledgment message with the firewall traversal protocol on the first network device from the second network device network creating a virtual data transfer-window through the first firewall, wherein the second secure message includes firewall traversal information from the first secure message to authenticate the second network device;

receiving a plurality of secure data packets on the first network device in the virtual data transfer-window through the first firewall from the second network device, wherein the plurality of secure data packets received through the virtual data transfer-window in the firewall include firewall traversal information from the first secure message to authenticate the plurality of secure data packets at the first firewall;

receiving a close transfer window message through with the firewall traversal protocol on the first network device inside the first firewall from the second network device outside the first firewall to close the virtual data transfer-window through the first firewall; and sending a close transfer window acknowledgment message with the firewall traversal protocol from the first network device inside the first firewall to the second network device outside the first firewall to acknowledge closing of the virtual data transfer-window through the first firewall.

19. A computer readable medium having stored therein instructions for causing a central processing unit to execute the method of claim 18.

20. The method of claim 18 wherein the virtual data transfer-window is a virtual tunnel through the first firewall.

\* \* \* \* \*